United States Patent [19]

Inoue et al.

[11] Patent Number: 4,796,383
[45] Date of Patent: Jan. 10, 1989

[54] COLLAPSIBLE REUSABLE PLANTER BOX

[75] Inventors: Bert Inoue, Simi Valley; Phil Lee, Moorpark, both of Calif.

[73] Assignee: Dura Lee, Ltd., Moorpark, Calif.

[21] Appl. No.: 868,263

[22] Filed: May 29, 1986

[51] Int. Cl.4 .................. A01G 9/02; 47 66; 47 73; 47 77; 47 76; 217 65; 220 4 F; 220 77; 403 253; 403 254; 403 231

[52] U.S. Cl. ........................ 47/73; 217/65; 403/254

[58] Field of Search .......... 47/66, 73, 77, 76; 217/65; 220/4 F, 77; 403/523, 254, 231

[56] References Cited

U.S. PATENT DOCUMENTS

| 114,638 | 5/1871 | Booher . | |
|---|---|---|---|
| D. 150,258 | 7/1948 | Rosenberg | D11/155 |
| D. 271,289 | 11/1983 | Carlson | D11/152 |
| D. 285,032 | 8/1986 | Alonzo | D11/152 |
| 716,668 | 12/1902 | Cheney . | |
| 861,046 | 7/1907 | Norum | 47/73 |
| 1,344,601 | 6/1920 | Walgren . | |
| 1,500,917 | 7/1924 | Bell . | |
| 1,602,783 | 10/1926 | Sands . | |
| 1,776,375 | 9/1930 | Russell | 47/73 |
| 1,858,902 | 5/1932 | Prantl . | |
| 1,869,606 | 8/1932 | Mennell . | |
| 2,025,420 | 10/1935 | Osgood . | |
| 2,110,670 | 8/1938 | Johnson . | |
| 2,135,813 | 11/1938 | Hartman | D34/1 |
| 2,140,932 | 12/1938 | Avery . | |
| 2,150,453 | 3/1939 | Mulford . | |
| 2,318,711 | 5/1943 | Phelan . | |
| 2,596,995 | 5/1952 | Hamilton | 217/65 X |
| 2,792,142 | 5/1957 | Sandrahle | 47/73 |
| 3,006,496 | 10/1961 | Weiman | D11/155 |
| 3,047,183 | 7/1962 | Papa . | |
| 3,080,083 | 6/1963 | Sutherlan . | |
| 3,719,301 | 3/1973 | Boppart . | |
| 3,760,970 | 11/1973 | Lutz . | |
| 3,917,102 | 7/1975 | Repetti . | |
| 4,091,928 | 5/1978 | Bernardo . | |
| 4,120,119 | 10/1978 | Engel | 47/66 |
| 4,212,134 | 7/1980 | Brokamp . | |
| 4,363,189 | 12/1982 | O'Donnell, III . | |

FOREIGN PATENT DOCUMENTS

| 987529 | 8/1951 | France | 47/73 |
|---|---|---|---|
| 224569 | 12/1942 | Switzerland | 47/73 |

Primary Examiner—Robert A. Hafer
Assistant Examiner—Danton D. DeMille
Attorney, Agent, or Firm—Poms, Smith, Lande & Rose

[57] ABSTRACT

A reusable planter box with four side panels can be assembled and disassembled with ease, and are still durable enough to accommodate large plants and trees. The side panels of the planter box contain three inserting means on one edge and three receiving means on the second edge that can be brought together to form the connection between the two adjacent panels. These connections are secured by securing means located adjacent to the receiving means and hold the inserting means in place. The connection can be further secured by placing a cotter pin in a horizontal bore through the inserting means preventing the inserting means and receiving means from detaching. The lower part of the planter forms a ledge on which a disposable bottom shelf can be placed. Footings on each panel raise the shelf above the ground, which slows deterioration of the shelf and prevents roots from growing into the ground.

12 Claims, 3 Drawing Sheets

COLLAPSIBLE REUSABLE PLANTER BOX

BACKGROUND OF THE INVENTION

1. Field of the Invention

This invention relates to an apparatus used to contain plants and soil and, more specifically, to a reusable planter box capable of being easily assembled and disassembled.

2. Description of the Prior Art

In a nursery where trees and large plants are grown and sold, the nursery must be able to move and replant the vegetation with a minimum amount of effort and at a low cost.

A number of devices have been developed in the area of planters and in the area of containers in general. These devices have had varying objectives and varying degrees of success. Some devices include tab and slot connections used to form a planter box or to hold the elements together, but the tab and slot connections often do not work alone. They require the attachment of additional elements to insure that the connections remain assembled until otherwise desired.

In U.S. Pat. Nos. 114,638 (1871) to Booher and 3,760,970 (1973) to Lutz, metal buildings run down each corner of the container where the separate elements come together. U.S. Pat. No. 3,047,183 (1962) to Papa uses metal corners which are located along the top and bottom edges of the container and U.S. Pat. No. 3,080,083 (1963) to Sutherlan has a frame which runs along the top and bottom perimeters of the container. These additional elements are attached to the containers in various manners and tools are required to assemble and disassemble the containers.

Among the general containers developed is the one described in U.S. Pat. No. 2,025,420 (1935) to Osgood for a collapsible wooden shipping box. The box incorporates tab and slot connections, but tape is used to insure that the connections do not separate. U.S. Pat. No. 1,344,601 (1920) to Walgren described a cylindrical container in which the cylinder is formed from a single sheet of material. The bottom is attached to the cylinder using spring clips and can be assembled and disassembled without the use of tools. When the container is full, the pressure along the cylinder is said to strengthen the bond between the cylinder and the bottom member making disassembly at this time difficult. U.S. Pat. No. 1,500,917 (1924) to Bell involves a cylindrical container with two elements that are joined together using hooks to form the cylinder. The bottom of the container is attached to the cylinder with wire that runs the perimeter of the cylinder.

U.S. Pat. No. 2,140,932 (1938) to Avery is intended for horticulture use. A pot or container is stamped out of a single sheet of leather. It is constructed by folding the sheet and inserting tabs into slots. The pot was designed to decompose quickly and easily and to be planted along with the plants. U.S. Pat. No. 716,668 (1902) to Cheney uses stubs and sockets to construct a decorative holder into which a plant in a pot can be placed.

The most common container for growing plants uses four wooden walls, each with its perimeter reinforced to form the sides of a box. Metal straps or wire hold the sides together. To remove the plant, the straps are cut and the slats fall away from the plant. The life of the wooden slats is short. They often deteriorate and are not reusable, which increases the cost to the nursery. The bottom of the wooden containers rests on the soil. Roots often creep out from the container into the surrounding soil making removal of the plants difficult.

SUMMARY OF THE INVENTION

An object of the present invention is to disclose and provide a novel and improved reusable planter box capable of being easily assembled and disassembled without the use of tools. Even though the planter box assembles easily, it is still durable and can contain large plants or trees.

The planter box of the present invention has four separate and identical plastic panels that snap together using tabs and slots. In the preferred embodiment, the tabs are L-shaped members that extend from the side panel. The L-shaped members have a height and width that correlate with the opening of the slots, enabling the slots to receive the corresponding L-shaped members. The interdependence of the dimensions of the L-shaped members and the slots allows each L-shaped member to pass through the correspsonding slot and attach onto a rim that runs the length of each side edge of the panel.

The tab and slot connections are secured by knobs situated adjacent to the slots in such a way that they hold the tabs in place. To additionally insure the connection between the tabs and slots, a cotter pin or similar item can be placed through a horizontal bore in the tabs. The pin inside the bore increases the width of the tab and prevents the tab from fitting through the slot.

The side edges of each panel of the planter box are tapered. Each panel has a smooth inner surface which can be pulled away from the plant without disturbing the root ball. The outer surface includes a series of ribs, which add to the structural strength of the planter box.

These and other features and objects of the invention will be apparent to those skilled in the art from the following detailed description of the preferred embodiment, taken together with the accompanying drawings in which:

DETAILED DESCRIPTION OF THE PREFERRED EMBODIMENT

Figure 1:
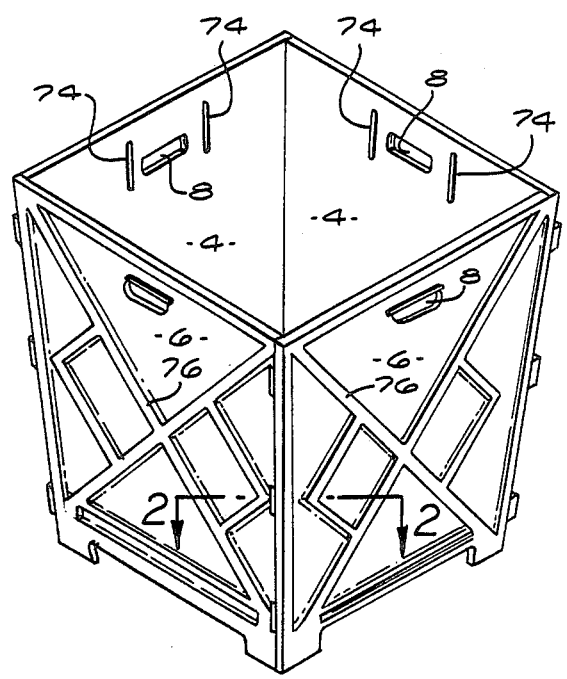
FIG. 1 is a perspective view of the assembled planter box of the present invention.
Figure 2:
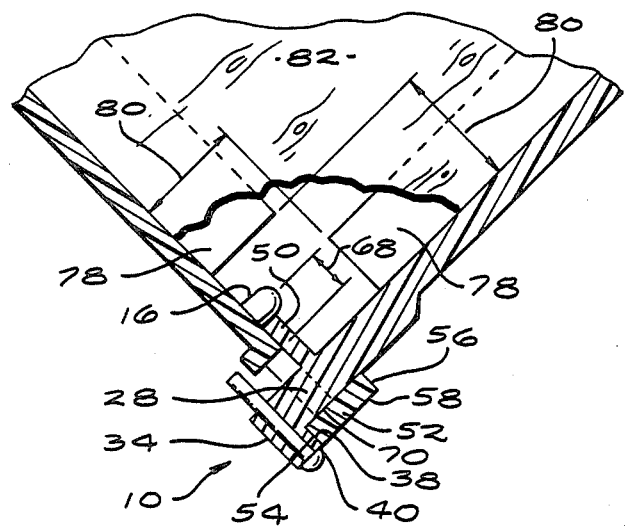
FIG. 2 is a fragmentary sectional view taken along plane 2—2 of FIG. 1.
Figure 3:
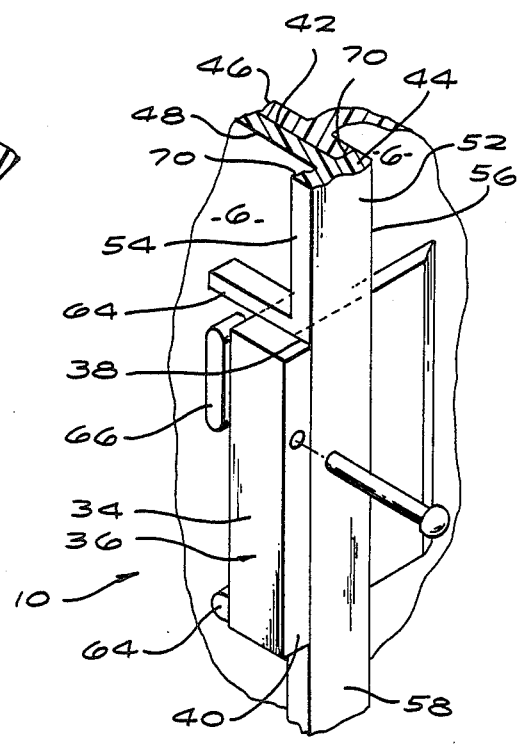
FIG. 3 is a fragmentary front elevation view of the inserting means - receiving means connection.
Figure 6:
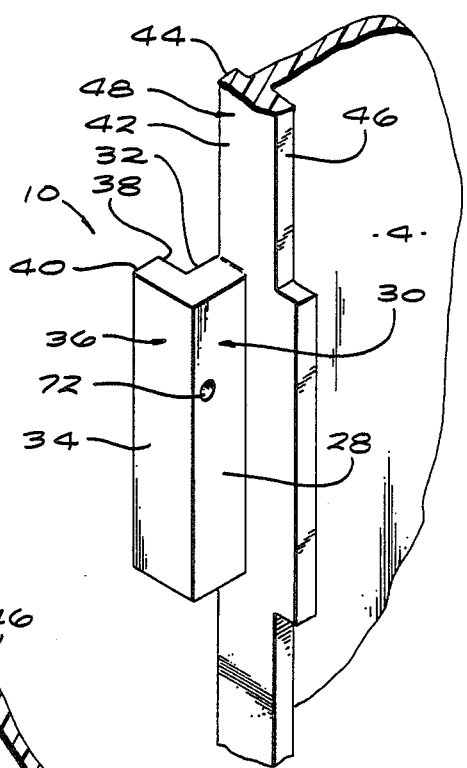
FIG. 6 is a fragmentary view of the inserting means of the side panel.
Figure 7:
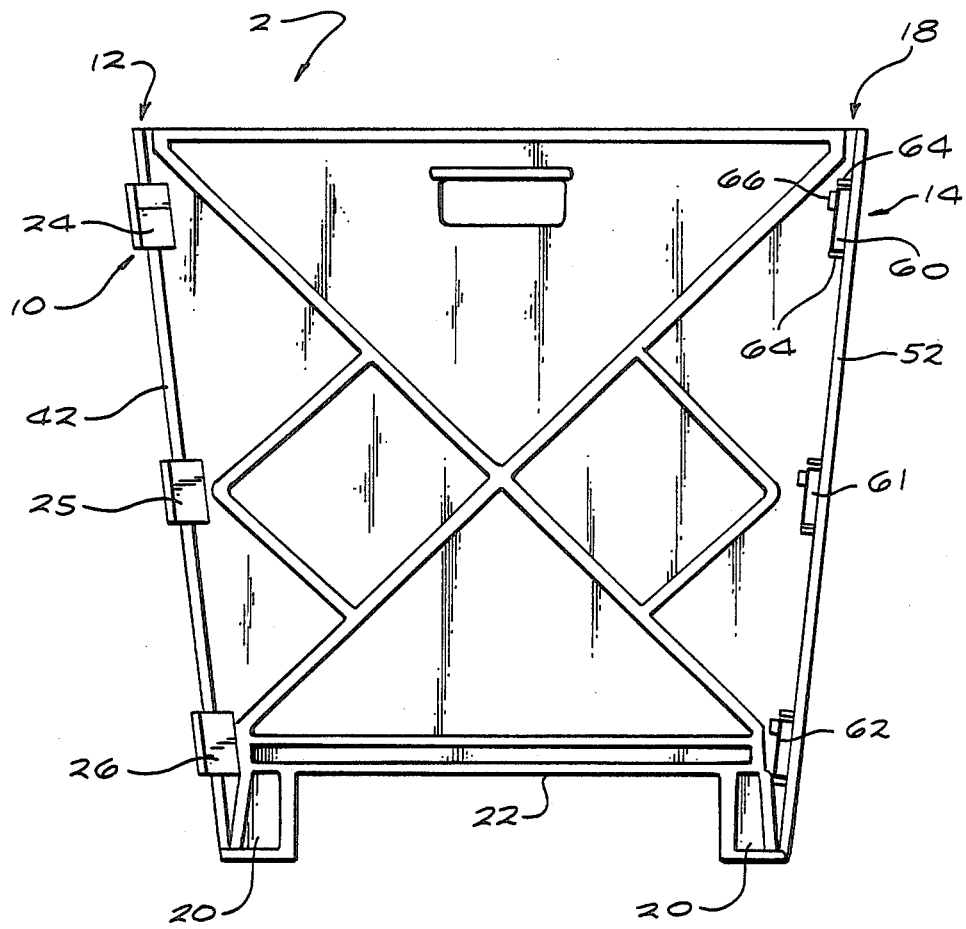
FIG. 7 is an elevation of the outer surface of a side panel of the present invention.

The planter box according to the invention is made up of four, injection molded, plastic side panels 2 (FIGS. 1 and 7). Each panel has tapered sides (FIG. 7) with an inner surface 4 and an outer surface 6. An aperture 8 near the top of the panel is intended to be used as a handle. Each panel has inserting means 10 (FIGS. 2, 3, 6 and 7) spaced along the first side edge 12 of the panel, corresponding receiving means 14 (FIGS. 2, 3 and 7)

and securing means 16 (FIGS. 4 and 5) spaced along the second side edge 18 of the panel, and footings 20 located at each corner of the bottom edge 22 of the panel.

The first side edge 12 of the panel contains the inserting means 10. In the illustrated example of the present invention, the inserting means comprise three L-shaped members 24, 25 and 26 (FIG. 7). A leg 28 of each L-shaped member (e.g. member 10 in FIGS. 2 and 6) extends beyond the first side edge 12 of panel 2 along the plane of the panel. Leg 28 includes a support face 30, which is located on the outer perimeter of the L-shaped member, and a seat 32, which is located on the inner perimeter of the L-shaped member. The base 34 of the L-shaped member extends out from the leg 28 on the side of the outer surface 6. The base 34 includes 3 sides; footing face 36 located on the outer perimeter of the L-shaped member, toe 38 located on the inner perimeter of the L-shaped member, and shoulder 40, which lies between toe 38 and footing face 36.

A reinforcing rim 42 (FIGS. 3, 4, 5 and 6) runs the length of the first side edge 12 and extends beyond the first side edge in both directions. The rim 42 includes two side faces 44 and 46 of equal width and a front face 48. An additional extension 50 of the rim towards the side of inner surface 4 and a built-up portion 51 on the outer surface 6 are located where rim 42 contacts the three L-shaped members 24, 25 and 26. In a manner similar to reinforcing rim 42 on first side edge 12, rim 52 runs along the length of the second side edge 18 (FIGS. 2, 3, 4 and 5). Rim 52 also includes two side faces 54 and 56 of equal width and a front face 58. Rim 52 has no similar additional extensions.

The second side edge 18 of the panel contains the receiving means 14 and the securing means. As illustrated primarily in FIG. 7, the receiving means includes three slots 60, 61 and 62, positioned so each receives a corresponding L-shaped member when the planter box is assembled (FIG. 1). Each slot 60, 61 and 62 has a vertical dimension slightly greater than the height of the footing face 36 of the corresponding L-shaped member 24, 25 and 26. The horizontal width of the footing face 36 of each L-shaped member is slightly less than the width of the corresponding slot. Top and bottom protrusions 64 and side protrusion 66 (FIG. 3) located on the outer surface 6 reinforce the area around each slot.

Figure 4:
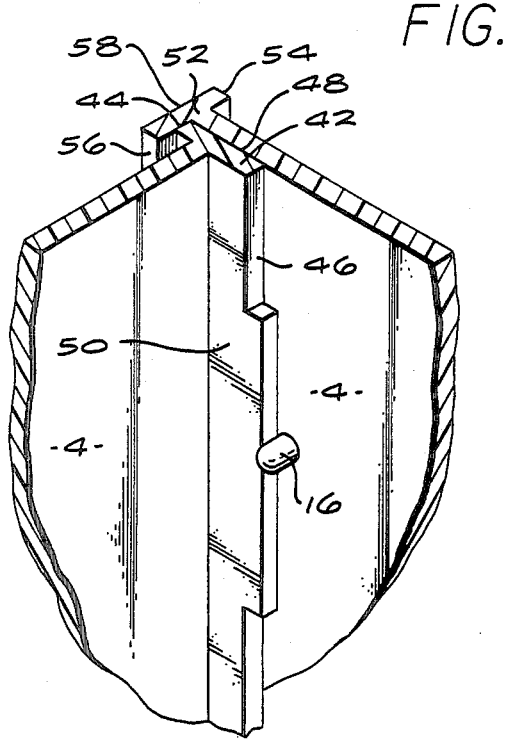
FIG. 4 is a fragmentary rear elevation view of the inserting means - receiving means connection.
Figure 5:
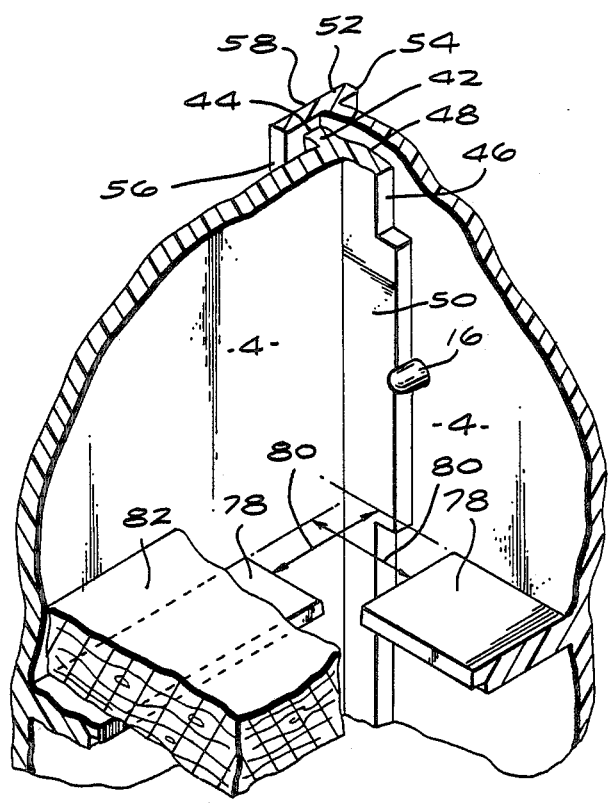
FIG. 5 is a fragmentary rear elevation view of the inserting means - receiving means connection and the ledge along the bottom edge of the side panel.

The securing means lie adjacent to and a distance 68 from the receiving means 14 and secure the connection between the inserting means 10 and the receiving means 14. In the exemplary embodiment, the securing means include knobs 16 (FIGS. 2, 4 and 5). The knobs 16 are located on the inner surface 4 of the side panel. The first and second knobs lie a distance 68 from the top and center slots 60 and 61. The third knob is located on the footing 20.

The interdependence of the dimensions of the base 34 of the L-shaped members 24, 25 and 26 and the slots 60, 61 qand 62 allows each base 34 to pass through the corresponding slot. As FIGS. 2 and 3 show, the toe 38 of the inserting means 10 and the side face 54 of rim 52 are of similar lengths. Seat 32 of the inserting means 10 and the inner dimension 70 of rim 52 are also of similar length. This allows the base 34 to pass through the corresponding slot bringing the connection together so that toe 38 of the inserting means rests on the side face 54 of rim 52. The corresponding dimensions of toe 38 and side face 54 bring shoulder 40 flush with the front face 58 of rim 52. The two adjacent side panels are then pulled together causing the built-up portion 51 to rest against the inner dimension 70 of rim 52 and causing the extension 50 of rim 42 to abut against knob 16. The combined width of the rim 42 and the extension 50 allows the extension to lie adjacent to knob 16 holding the toe 38 and the rim 52 connection in place. When the two side panels are brought together, rim 42 and extension 50 lie between the inner dimension 70 of rim 52 and knob 16. The side face 44 of rim 42 abuts the inner dimension 70 of rim 52 and the front face 48 of rim 42 lies up against the inner surface 4 of the adjacent side panel. These elements comprise the connection between the two adjacent panels and insure that the panels do not separate until intended.

A horizontal bore 72 may be provided through base 34 of each L-shaped member 24, 25 and 26 (FIGS. 2, 3 and 6). A cotter pin or other similar item can be inserted through bore 72 to secure the connection between the two adjacent side panels. The interdependent dimensions of the footing face 36 and the receiving means 14 requires that the cotter pin only extend a short distance beyond either side of the bore 72 in order to insure that the receiving means and inserting means do not separate.

The inner surface 4 of each side panel 2 is generally smooth. The soil contained in the planter is less likely to attach to a smooth surface and the soil and root ball are less likely to be disturbed when the plant is removed from the container. Short vertical ribs 74 (FIG. 1) extend along the inner surface 4 of the side panel along both ends of the handle opening 8 reinforcing the area around the handle. The ribs are small enough so that they do not interfer with the removal of the plant.

Outer surface 6 of the side panel 2 contains a rib design 76 (FIG. 7), which reinforces the panel. The ribbing adds to the strength of the panel under the pressure load of the plant, soil and water.

Horizontal ledge 78 (FIGS. 2 and 5) extends the bottom of inner surface 4 above the footings 20. The ledge terminates a sufficient distance 80 (FIG. 2) from the first side edge 12 and the second side edge 18 so as not to interfer with the connection between rim 42 and rim 52. Ledge 78 serves as a support for a disposable shelf 82 (FIGS. 2 and 5). The design of the ledge 78 raises shelf 82 above the ground, which slows deterioration of the shelf and prevents roots from growing into the ground.

The design of the planter box as disclosed in the invention allows for a strong and durable, reusable planter box capable of being assembled and disassembled without the use of tools. As numerous modifications and alternate embodiments on the invention will occur to those skilled in the art, it is intended that the invention be limited only in terms of the apended claims.

I claim:

1. A side panel capable of being connected to the other side panels to form a planter box comprising:
   a. an inner surface and an outer surface, a top and a bottom edge and first and second side edges;
   b. inserting means on the first side edge and receiving means adjacent to the second side edge, the inserting means of one side panel capable of being connected with the corresponding receiving means of an adjacent side panel;
   c. securing means on the side panel located adjacent to the receiving means for securing the connection between the inserting means and the receiving means; and d. the side panel is in a plane, and wherein the first and second side edges contain rims that run along the first and second side edges and are perpendicular to the plane of the side panel wherein the securing means is adapted to engage one edge of the rim of the first side edge.

2. The side panel of claim 1, wherein the inner surface is generally smooth and the outer surface is ribbed.

3. The side panel of claim 1, further comprising foot portions extending from the bottom edge for supporting the planter.

4. The side panel of claim 1, wherein the inserting means comprises a plurality of angle-shaped members extending outward from the first side edge, and the receiving means comprises a plurality of slots on the second side edge, of a size to receive the corresponding angle-shaped members.

5. The side panel of claim 4, wherein the angle-shaped member contains at least two segments, the first segment being attached to the side panel, the second segment being attached to the first segment and having a horizontal bore passing through the second segment.

6. The side panel of claim 5 wherein the first segment is parallel to the plane of the side panel and the second segment is perpendicular to the first segment.

7. A planter box comprising:
a. a plurality of side panels arranged together as a polyhedron, each side panel having an inner surface and an outer surface, a top and a bottom edge and first and second side edges;
b. inserting means on the first side edge, and receiving means adjacent to the second side edge, the inserting means of one side panel being connected with the corresponding receiving means of an adjacent side panel;
c. securing means on each side panel located adjacent to the receiving means for securing the connection between the inserting means and the receiving means; and
d. each side panel is in a plane, and wherein the first and second side edges contain rims that run along the first and second side edges and are perpendicular to the plane of the side panel wherein the securing means is adapted to engage one edge of the rim of the first side edge.

8. The planter box of claim 1, wherein the inner surface of each side panel is generally smooth and the outer surface of each side panel is ribbed.

9. The planter box of claim 1, wherein the inserting means comprises a plurality of angle-shaped members extending outward from the first side edge, and the receiving means comprises a plurality of slots on the second side edge, of a size to receive the corresponding angle-shaped members.

10. The planter box of claim 9, wherein the angle-shaped member contains at least two segments, the first segment being attached to the side panel, the second segment being attached to the first segment and having a horizontal bore passing through the second segment.

11. The planter box of claim 10 wherein the first segment is parallel to the plane of the side panel and the second segment is perpendicular to the first segment.

12. The planter box of claim 10 wherein the horizontal bore receives a pin, the pin blocking removal of the inserting means from the corresponding receiving means.

* * * * *